United States Patent
Golan et al.

(10) Patent No.: US 8,447,640 B2
(45) Date of Patent: May 21, 2013

(54) DEVICE, SYSTEM AND METHOD OF HANDLING USER REQUESTS

(75) Inventors: Yaniv Golan, Kfar Saba (IL); Avichay Nissenbaum, Ramot Hashavim (IL)

(73) Assignee: Yedda, Inc., Dulles, VA (US)

( * ) Notice: Subject to any disclaimer, the term of this patent is extended or adjusted under 35 U.S.C. 154(b) by 1435 days.

(21) Appl. No.: 12/065,717

(22) PCT Filed: Sep. 13, 2006

(86) PCT No.: PCT/IL2006/001072
§ 371 (c)(1),
(2), (4) Date: Mar. 4, 2008

(87) PCT Pub. No.: WO2007/032003
PCT Pub. Date: Mar. 22, 2007

(65) Prior Publication Data
US 2008/0235005 A1 Sep. 25, 2008

Related U.S. Application Data

(60) Provisional application No. 60/716,078, filed on Sep. 13, 2005, provisional application No. 60/750,358, filed on Dec. 15, 2005.

(51) Int. Cl.
*G06Q 10/00* (2006.01)

(52) U.S. Cl.
USPC .......................... 705/7.13; 705/7.14; 705/7.21

(58) Field of Classification Search
USPC ........................ 705/7.13, 7.14, 7.21
See application file for complete search history.

(56) References Cited

U.S. PATENT DOCUMENTS

| | | | |
|---|---|---|---|
| 5,862,223 A | 1/1999 | Walker et al. | |
| 6,058,389 A | 5/2000 | Chandra et al. | |
| 6,064,978 A | 5/2000 | Gardner et al. | |
| 6,088,692 A | 7/2000 | Driscoll | |
| 6,223,165 B1 | 4/2001 | Lauffer | |
| 6,275,811 B1 | 8/2001 | Ginn | |
| 6,523,010 B2 | 2/2003 | Lauffer | |
| 6,523,026 B1 * | 2/2003 | Gillis | 1/1 |
| 6,631,377 B2 | 10/2003 | Kuzumaki | |
| 6,732,088 B1 * | 5/2004 | Glance | 1/1 |
| 6,763,520 B1 | 7/2004 | Seeds | |
| 6,801,899 B2 | 10/2004 | Lauffer | |
| 6,850,923 B1 | 2/2005 | Nakisa et al. | |
| 6,938,068 B1 | 8/2005 | Kraft et al. | |

(Continued)

OTHER PUBLICATIONS

Sheikholeslami, Gholamhosein, Wendy Chang, and Aidong Zhang. "SemQuery: Semantic Clustering and Querying on Heterogeneous Features for Visual Data." IEEE Transactions on Knowledge and Data Engineering. 14.5 (2002): 988-1002.*

(Continued)

*Primary Examiner* — Andre Boyce
*Assistant Examiner* — William Brockington, III
(74) *Attorney, Agent, or Firm* — Finnegan, Henderson, Farabow, Garrett & Dunner LLP (57) ABSTRACT

Devices, systems and methods of handling user requests. For example, a method includes: receiving an electronic representation of a submitted request; calculating request-related information, submitter-related information, and/or recipient-related information; based on the request-related information and the submitter-related information, determining one or more recipients for the request; distributing the request to said one or more recipients; and storing the request and one or more responses received from said one or more recipients.

27 Claims, 7 Drawing Sheets

U.S. PATENT DOCUMENTS

| | | | |
|---|---|---|---|
| 7,050,753 | B2 | 5/2006 | Knutson |
| 7,155,157 | B2 | 12/2006 | Kaplan |
| 7,162,508 | B2 | 1/2007 | Messina |
| 7,176,949 | B1 | 2/2007 | Moser |
| 7,224,781 | B2 | 5/2007 | Jacob et al. |
| 7,685,118 | B2 * | 3/2010 | Zhang .............................. 706/55 |
| 2003/0014463 | A1 | 1/2003 | Togawa |
| 2003/0126136 | A1 * | 7/2003 | Omoigui ........................ 707/10 |
| 2004/0024739 | A1 * | 2/2004 | Copperman et al. .............. 707/1 |
| 2005/0080657 | A1 * | 4/2005 | Crow et al. ....................... 705/8 |
| 2005/0149510 | A1 | 7/2005 | Shafrir |
| 2005/0267871 | A1 * | 12/2005 | Marchisio et al. ................ 707/3 |
| 2006/0015488 | A1 | 1/2006 | Perisic et al. |
| 2006/0047615 | A1 * | 3/2006 | Ravin et al. ..................... 706/50 |
| 2006/0167846 | A1 | 7/2006 | Nevin et al. |
| 2006/0253385 | A1 * | 11/2006 | Reams ........................... 705/37 |
| 2006/0265367 | A1 * | 11/2006 | Allys et al. ........................ 707/5 |
| 2007/0005566 | A1 | 1/2007 | Bobick et al. |
| 2007/0064913 | A1 * | 3/2007 | Shaffer et al. ............ 379/265.02 |
| 2007/0140467 | A1 | 6/2007 | McCormack et al. |
| 2007/0168345 | A1 | 7/2007 | Gibbs et al. |
| 2007/0294232 | A1 | 12/2007 | Gibbs et al. |
| 2008/0001948 | A1 | 1/2008 | Hirsch |
| 2008/0016020 | A1 | 1/2008 | Estes |
| 2008/0016036 | A1 | 1/2008 | Omoigui |
| 2008/0016240 | A1 | 1/2008 | Balandin |
| 2009/0037390 | A1 * | 2/2009 | Handley ........................... 707/3 |

OTHER PUBLICATIONS

Printed web page titled "WikiAnswers—The Q&A wiki," printed from http://wiki.answers.com/ on Apr. 15, 2008.

* cited by examiner

DEVICE, SYSTEM AND METHOD OF HANDLING USER REQUESTS

RELATED APPLICATIONS

This application is the U.S. National Phase under 35 U.S.C. §371 of International Application No. PCT/IL2006/001072, filed Sep. 13, 2006 (published as WO 2007/032003 A2), which claims priority to US. Provisional Application Nos. 60/716,078, filed Sep. 13, 2005, and 60/750,358, filed Dec. 15, 2005. The disclosures of the above-referenced applications are hereby incorporated by reference.

FIELD OF THE INVENTION

The present invention relates to the field of information technology (IT). More specifically, the present invention relates to devices, systems and methods for handling requests and questions submitted by users.

BACKGROUND OF THE INVENTION

Numerous electronic databases and resources, for example, World Wide Web sites and pages, files and documents stored on various types of Internet servers in various formats, chat room conversations, and the like, may include significant amount of useful information. Due to the large amount of information available electronically, it may be difficult and time consuming to retrieve an answer to a specific question or request presented by a user. In addition, requested information may not be documented or otherwise available online.

SUMMARY OF THE INVENTION

Some embodiments of the invention may include, for example, systems and methods to match and distribute a set of requests from people to a set of resources potentially able to fulfill these requests, taking into account multiple inputs including the relevancy of the resource to the request using an algorithm that calculates the semantic relationship between pairs in a group of objects, and attempting to maximize the amount of valuable knowledge exchanged between groups of people.

Some embodiments of the invention may include, for example, a distribution system used in conjunction with the matching system, and/or a relevancy calculation mechanism used by the matching system.

Some embodiments of the invention may provide additional and/or other advantages or benefits, as will be apparent from the description below.

BRIEF DESCRIPTION OF THE DRAWINGS

The principles and operation of the system, apparatus, and method according to the present invention may be better understood with reference to the drawings, and the following description, it being understood that these drawings are given for illustrative purposes only and are not meant to be limiting, wherein.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements throughout the serial views.

DETAILED DESCRIPTION OF THE INVENTION

In the following detailed description, numerous specific details are set forth in order to provide a thorough understanding of the present invention. However, it will be understood by those skilled in the art that the present invention may be practiced without these specific details. In other instances, well-known methods, procedures, and components have not been described in detail so as not to obscure the present invention.

Some embodiments of the invention may include, for example, systems and methods to match and distribute a set of requests from people to a set of resources potentially able to fulfill these requests, taking into account multiple inputs including the relevancy of the resource to the request using an algorithm that calculates the semantic relationship between pairs in a group of objects, and attempting to maximize the amount of valuable knowledge exchanged between groups of people.

Some embodiments of the invention may include, for example, a distribution system used in conjunction with the matching system, and/or a relevancy calculation mechanism used by the matching system.

Some embodiments of the invention may include, for example, a distribution component used in an internet-based service which may create a full-service, user-centric web experience. Some embodiments may create a full-service user-centric web experience, reducing the time and effort to value associated with searching for information, knowledge, goods and/or services.

In some embodiments, users provide their request(s) to the service through one or more routes or electronic venues, such as web browser client, email, SMS, instant messaging client, web service, voice, or the like. The request may be a request for knowledge, fact, recommendation, information, opinion, services and/or goods. The request may be submitted in one or more formats, for example, free text, rich media (text and images, audio, video, audio/video, animation, and other non-textual media), structured request (a form corresponding to a predefined structure), or the like.

In some embodiments, the system creates a dynamic, dedicated web location (which may be referred to herein as "blog") for each request. The blog contains the request, responses to this request, comments on these responses, and other information sources relevant to the request and the responses. A response may include, for example, free text, rich media, a structured response, or the like.

In some embodiments, the service may provide the user highly relevant qualified response(s) in minimum response-time. In some embodiments, those responses are retrieved mainly from the network users. Some embodiments may thus proactively address (or otherwise send or route) the question to the most relevant available user(s).

In some embodiments, substantially in parallel, the system queues the request. The system continuously analyses the requests in the queue. The system may take into account multiple inputs, for example, the request, the categories and topics it is associated with, the set of entities (users and systems such as search engines and e-commerce sites) that may be able to provide a useful relevant response for this request, availability of these entities, their track record or performance history, capacity to handle a number of requests, user satisfaction, and other inputs. Based on these inputs and/or their analysis, the system decides who to distribute the request to, when to distribute, and in what manner, such that the overall consumption of the resources available for the system for providing responses to current and future requests in used in an optimal or efficient manner. The system continues to monitor and evaluate responses to the request, and if needed, modifies the distribution policy and queues the request again for processing or re-processing.

In some embodiments, users may be notified of responses to their questions, of relevant requests that they may be able to fulfill, and of other relevant events. The notification mechanism may be configured by the user(s), for example, notification through the web client user interface, instant messaging, email, SMS, voice prompt, RSS/Atom, web service, phone, mobile phone, wireless devices, or other electronic notification mechanisms.

In some embodiments, a Distribution Algorithm may determine the optimal policy for distributing requests to users, for example, by optimizing the usage of the resources available to a capacity-limited system, e.g., in order to fulfill one or more goals per each request, with the distribution system responsible for implementing the determined policy. The goals may include, for example: minimum time to fulfill a request; maximum relevancy of each response; optimize response cost; and/or other goals. In some embodiments, a user making a request may set or prioritize goals of the request.

In some embodiments, some goals may at times be conflicting. Therefore, the system balances them, for example, by attempting to reach optimal usage of the system's Request Fulfillment Potential over a period of time.

In some embodiments, the algorithm utilizes a learning system, which continuously profiles the user(s) and the system, and continuously adjusts the factors it uses based on the observed behavior of the system, and attempts to re-affirm and discover knowledge on the system and the users in a continuous basis and in a methodic manner.

Figure 1:
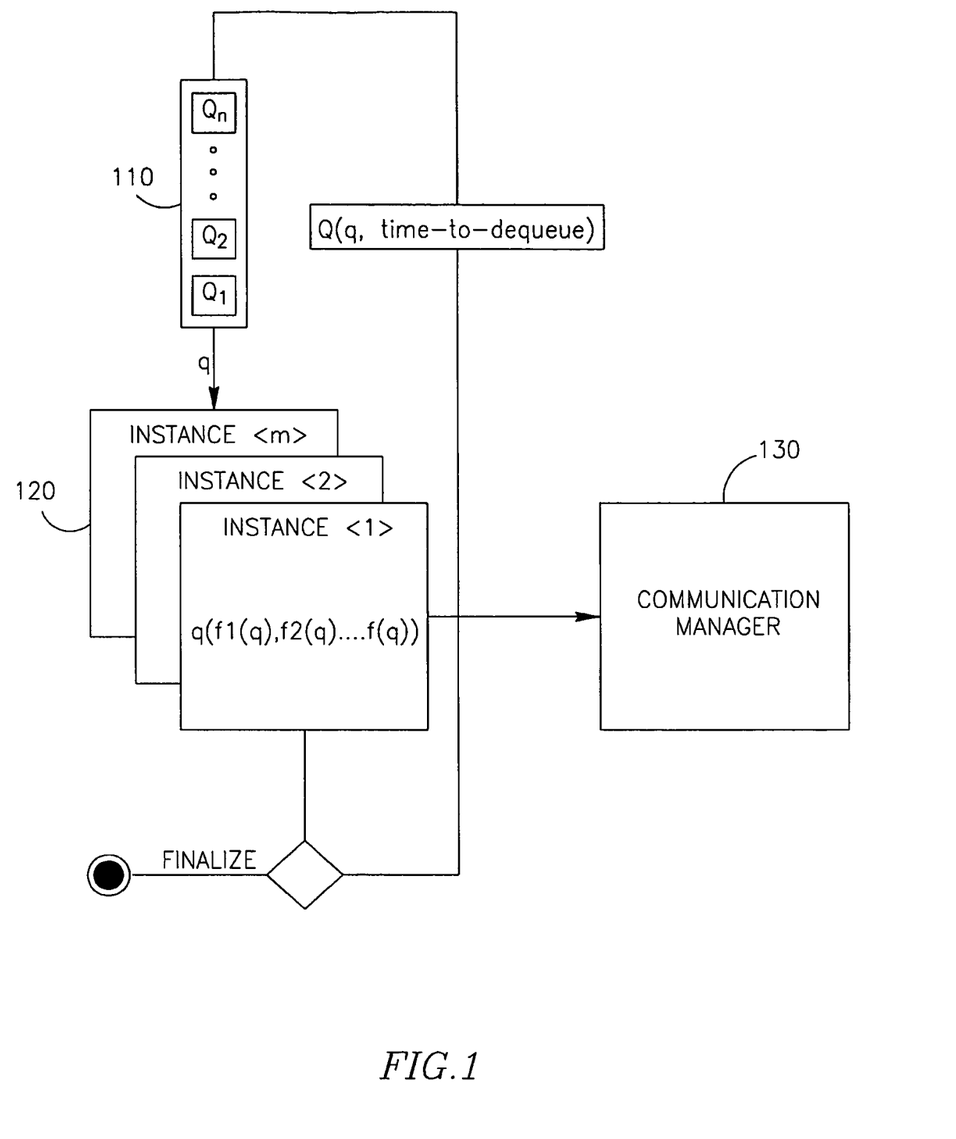
FIG. 1 is a schematic block diagram of a demonstrative architecture of a system for handling requests in accordance with some embodiments of the invention.

FIG. 1 is a schematic block diagram of a demonstrative architecture of a system for handling requests in accordance with some embodiments of the invention. A queue 110 may be, for example, a time-based delta queue holding all active requests (Q1 to Qn). The timestamps attached to each queued request indicate when the policy regarding this request should be re-examined.

One or more instances 120 may be associated with a distribution policy algorithm. For example, Instance <1> to Instance <m> may be multiple instances of the distribution policy algorithm, each one able to handle a single request at a time. The algorithm may use functions described herein as "Inputs", represented in FIG. 1 as f1 to fi, for example, to determine the optimal manner to handle a given request at a given time.

A communication manager 130 represents, for example, a link to a subsystem for executing the policy determined by the algorithm with regards to selectively routing the request to one or more recipients.

In some embodiments, the policy determined by the algorithm may fulfill two primary goals: minimum time to fulfill a request; and maximum relevancy of each response. Since these goals may at times be conflicting, the system balances them by attempting to reach optimal usage of the system's Request Fulfillment Potential over a period of time.

In some embodiments, in deciding how to route the request, the algorithm takes into account a series of inputs related to the request and the topics associated with it, the requesting user, past and projected system status (incoming requests rate, or the like) and information about potential providers of responses. These inputs are further described herein.

The inputs may have various effects on the algorithm policy. In some embodiments, for example, more requests may be routed to a responding user if the user is more available, if the user's history of responses is ranked higher or more recent, if the user's motivation is higher, if there is less information on this user (e.g., the user capabilities are not fully known yet), and/or if other conditions are met. In contrast, fewer requests may be routed to a responding user if the user cost is higher, if the user quota of questions per period is small or approaching exhaustion, if the user interaction frequency is low, or the like. Other suitable conditions or criteria may be used.

Figure 2A:
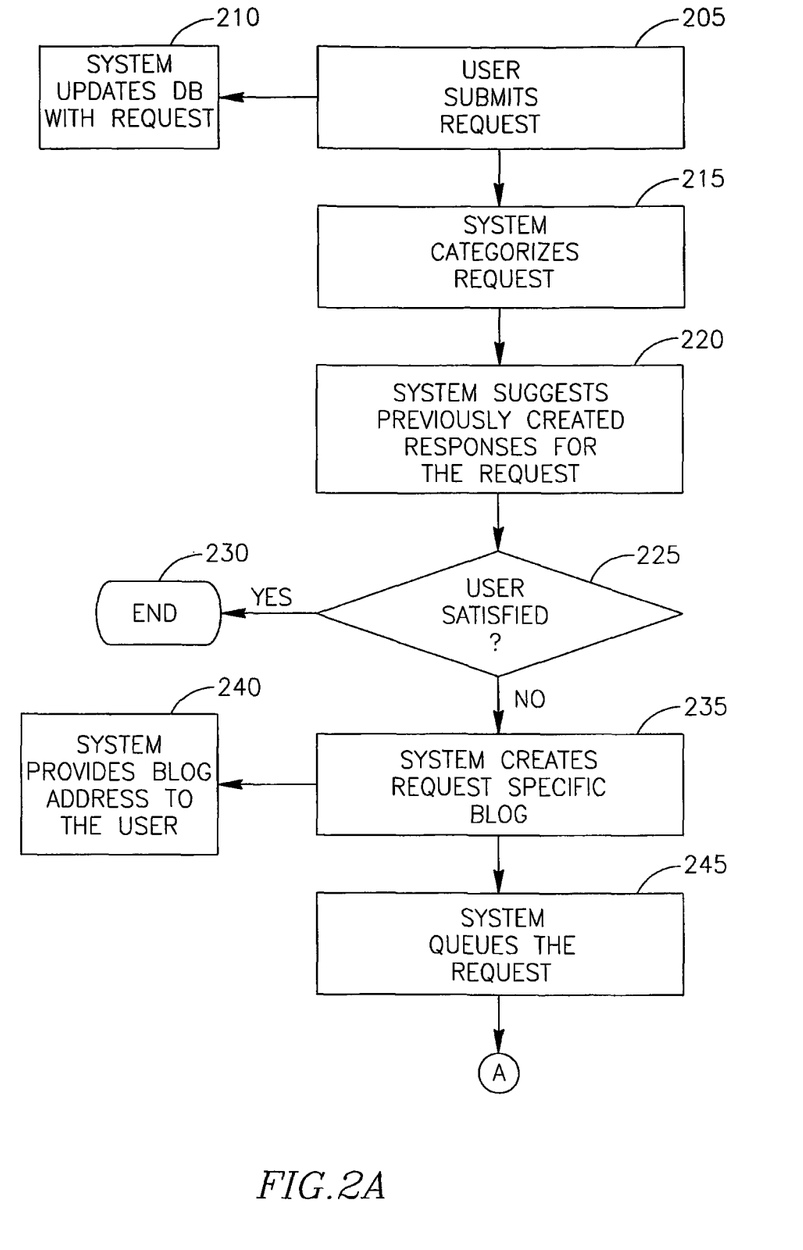
FIG. 2 is a flow-chart of a method of handling requests in accordance with some embodiments of the invention.
Figure 2B:
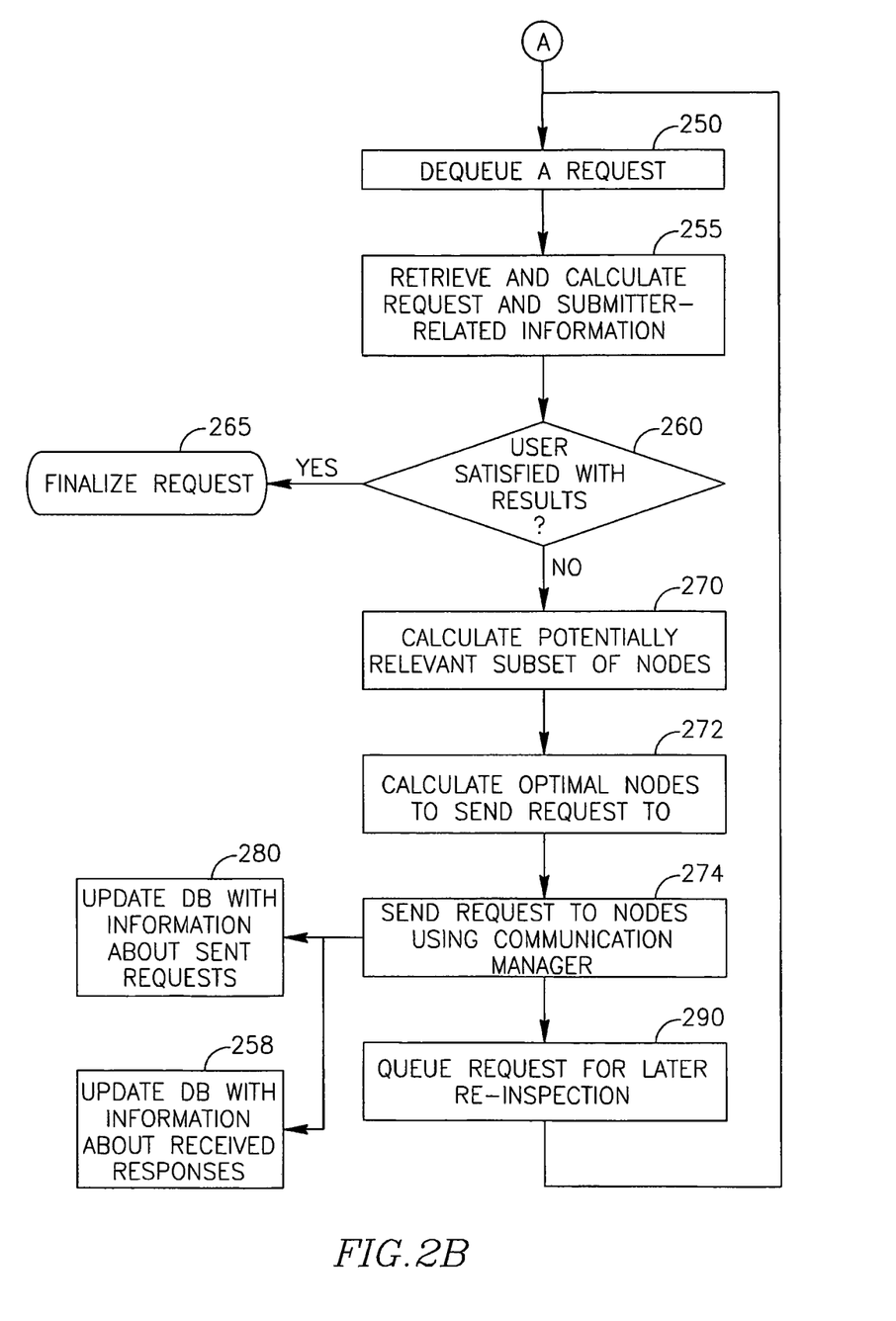

FIG. 2 is a flow chart of a method of handling requests in accordance with some embodiments of the invention. As shown in FIG. 2, a requesting user submits a request (block 205); the system updates a database with the request (block 210); the system categorizes the request (block 215); the system suggest previously created responses for the request (block 220).

A check may be performed of whether the user is satisfied: if the user is satisfied, the process may end (block 230); if the user is not satisfied, the process may proceed (blocks 235 and onward).

The system creates a request-specific blog (block 235); the system provides the blog address to the user (block 240); the system queues the request (block 245); later, the system de-queues the request (block 250); request-related information and/or submitter-related information may be retrieved and/or calculated (block 255).

A check may be performed (block 260) of whether the user is satisfied (e.g., with the results presented based on the information collected up to and including block 255). If the user is satisfied, then the request may be finalized (block 265), for example, considered or indicated as "fulfilled"). If the user is not satisfied, then the process may proceed with the operations of block 270 and onward.

Potentially-relevant subset of nodes may be calculated (block 270); optimal nodes to which the request is sent to may be calculated (block 272); the request may be sent to the selected nodes (block 274), for example, using a communication manager. The database may be updated with information about sent requests (block 280), and/or with information about received responses (block 285). The request may be queued for later re-inspection (block 290), and some of the above operations may be repeated, e.g., the operations of block 250 and onward.

In some embodiments, one or more functions may represent inputs that are available to the algorithm in its decision process. These functions provide information related to past and present data, and to future settings and extrapolations.

Table 1 demonstrates general functions and their respective operation, in accordance with some embodiments of the invention:

TABLE 1

| Function: | Operation: |
| --- | --- |
| all_users( ) | List of all users |
| all_users_except_req(req) | All users to which this request was not delivered yet |
| channels_all( ) | Returns the list of all communication known channels |
| channel_speed(channel) | The channel relative speed (1 = slowest, e.g., web; 10 = fastest, e.g., SMS) |
| res_per_req_factor(topic) | The desired responses per request factor for the specified topic |
| projected_load_topics(req) | The project number of incoming questions per day on the request topics |
| req_topics(req) | The topics that the request is associated with |

Table 2 demonstrates user-specific functions and their respective operations, in accordance with some embodiments of the invention:

TABLE 2

| Function: | Operation: |
| --- | --- |
| user_topics(user) | The list of topics in which the user can provide knowledge or proposals |
| user_topic_quota_num(user, topic) | The maximum num of requests that the user user agrees to receive in the topic topic during the period specified by the function user_topic_quota_period_days( ). |
| user_topic_quota_period_days (user, topic) | The period of time in days related to the result of the function user_topic_quota_nums( ) |
| user_topic_quota_available (user, topic, period_days) | Number of requests that can send to this user in the future period (specified in days) |
| user_ranking_avg(user) | The user average ranking |
| user_ranking_topic_avg(user, topic) | The user average ranking for the specified topic |
| user_cost_month(user) | The user cost on a scale of 1-10, with 1 being "free" and 10 being on an expensive payroll. |
| user_motivation(user) | Theoretic motivation (the relative extent of the use drive and obligation toward a known answering ratio) on a scale of 1-10 |
| user_must_answer_quota (user, period_hours) | If the user has a quota he must meet, what is the quota for the specified period in hours |
| user_requests_delivered (user, period_days) | How many requests were delivered to this user during the last few days (specified by period_days). |
| user_requests_answered (user, period_days) | How many requests were provided with answers by the specified user in the specified period |
| user_questions_answered_topic (user, topic, period_days) | How many requests were provided with answers by the specified user in the specified period in the specified topic |
| user_avg_avail_channel (user, channel, datetime) | Returns the user's average availability for the specified channel at the specified date-time given historical information. Availability is on a scale of 1-10. 1 = usually not available at this time; 10 = usually available at this time. |
| user_curr_avail_channel (user, channel) | Returns the user's current availability. 1 = not available or unknown; 10 = available. |
| user_competitiveness | Returns: 1 if user tends to answer more when no one else answered, 3 if user tends to answer more when there are already posted answers or comments, 2 if no clear pattern. |

In some embodiments, inputs used by the system may include, for example: list of users to whom to distribute the requests, and channels to use when distributing to each one of them (input for the communication manager); time to wait before checking the request status again (delta used for the queue); command to move the request into a finalized state; and/or other suitable inputs.

In some embodiments, the system may interact with other systems, or may be used in conjunction with other systems, for example: a system for tagging users in a way that describes their knowledge and interests based on self tagging and on automatic tagging through a learning system; a system for discovering tacit knowledge and transforming it into electronic media; a method for transforming a request in a natural language into an electronic format that captures the rest details and the expected response structure; a format for representation of requests for proposals and proposals that is expandable and supports evolution by community; a business method enabling electronic pro-active offering of a limited quantity of goods to a selected group of relevant people (e.g., the traveling sales man); a ranking system for evaluating the relative value of a user based on a learning system and on other users feedback; a method for selecting an appropriate content source based on the topics associated with a request and performing a focused search on the source in order to highlight relevant content; and/or other systems.

Some embodiments of the invention may include, for example, a Relevancy Calculation algorithm designed to calculate the semantic relationship between pairs in a group of objects with semantic context.

For example, given a group of object pairs {Pn}={(Oi Oj)}, the algorithm output may be a match level number between Oi and Oj.

The input may be, for example:
P1=(Oi Oj)
...
Pn=(Om On)
The output may be, for example:
P1:M1
P2:M2
...
P3:M3

Mn may represent the strength of the semantic relationship between the first item and the second item in the corresponding pair.

The calculation is performed after utilizing additional information sources such as anthologies and lexical databases, which are used to discover, evaluate, disambiguate and expand the semantic cloud associated with the objects.

The objects on which this algorithm is used may be person profiles, questions, answers, requests, responses, commercial products, service offering, web content, or other content.

For a person profile, the algorithm may employ a learning system, which continuously updates the persons profiles based on various elements such as the questions they ask, the answers they provide, their average response-time, the rank they got from the users, information generated about them in other systems (internal or external), and information they provide directly, such as categorization of their knowledge, tagging of their knowledge, and links to other systems. This results in a personalization of various operations such as suggesting topics for asked questions. Upon registration, the user may be requested to fill out a form or questionnaire in order to provide initial information about the user, including, for example, areas of knowledge, education, hobbies, etc. The questionnaire may include predefined categories and/or allow for free text.

For each individual pair, the result for a specific run may be the same regardless of the number of questions submitted in this run. However, resource utilization (CPU, database, etc.) may be lower for a batched run (multiple questions) then the sum of resource utilization for multiple single-question runs.

Figure 3:
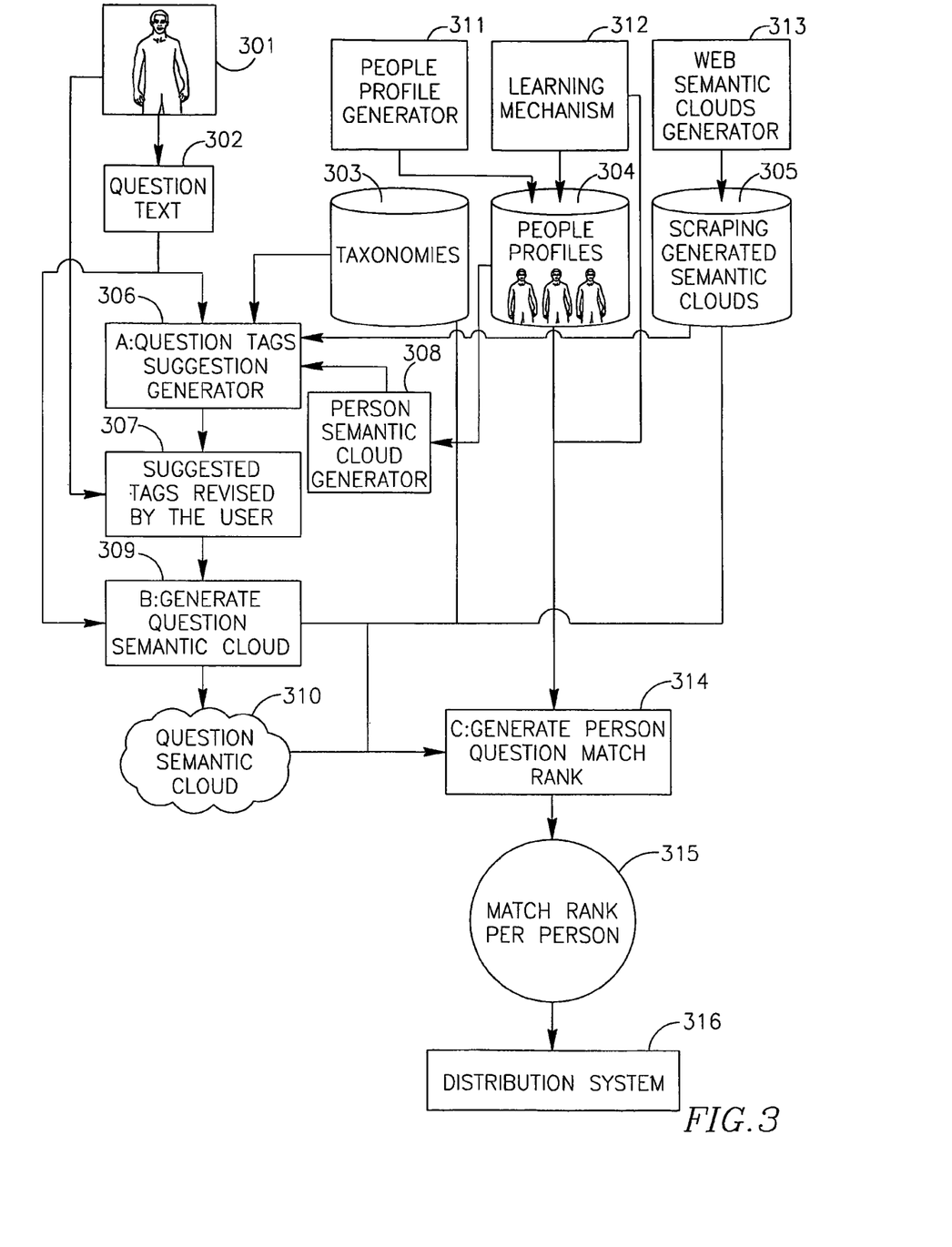
FIG. 3 is a schematic block diagram of architecture of a system utilizing an algorithm applied to matching questions with people, in accordance with some embodiments of the invention.

FIG. 3 is a schematic block diagram of architecture of a system utilizing an algorithm applied to matching questions with people, in accordance with some embodiments of the invention.

As shown in FIG. 3, a user 301 may submit a text question 302, which may be handled using one or more inter-connected components, for example, a taxonomies database 303, a people profiles database 304, a scraping-generated semantic clouds database 305, a question tags suggestion generator 306 (e.g., to produce suggested tags which may be revised by the user 301), a person semantic cloud generator 308, a generator 309 to generate a question semantic cloud 310, a people profiles generator 311, a learning mechanism 312, a web semantic clouds generator 313, a generator 314 to generate a person/question match rank (e.g., to generate a match rank per person 315), a distribution system 316, and/or other suitable units.

A semantic cloud may be, for example, a directed graph data structure, in which: all vertices are reachable from a single known root vertex; each vertex is associated with a textual keyword (tag); each edge (link between vertices) is associated with a numeric weight; and each vertex is associated with a numeric relevance factor.

The root vertex represents the object with which the semantic cloud is associated. All other vertices represent phrases (one word or more). The numeric weight represents the strength of the connection between the two vertices.

The relevance factor represents the relevance of the phrase associated with a specific vertex, to the root vertex, and is calculated as a function of all weights of all edges in all routes from the root vertex to the specific vertex, factored by the edge distance from the root.

A semantic cloud may be used to represent the list of phrases related to a specific object (e.g., person, question, or the like), the strength of the relationship (relevancy to the object), and the relationship between the phrases themselves.

In some embodiments, a semantic cloud "surrounds" (or is associated with) a specific object with widening circles of associations. The farther the association is from the object, the less relevant it is to the object.

In some embodiments, semantic clouds may be used to discover the strength of a relationship between two objects. The strength of the relationship, or the relevancy of one object to another, is represented by the amount and strength of the overlapping or correlation of their two semantic clouds.

Semantic clouds may be created, by integrating and traversing information collected from multiple sources such as web content from contents sites, shopping sites, forums, social services, experts exchanges and others, flat or hierarchical taxonomies, information provided by the user, online presences maintained by the user, objects (bookmarks, photographs, people and other objects) maintained or tagged by the user online or offline, lexical databases such as wordnet, documents provided by the user, and/or from additional sources.

The question tags suggestion generator 306 may receive as input: the text of a question, the person profile for the user that asked the question, and the accompanying user-agnostic semantic databases. The question tags suggestion generator 306 may generate a list of suggested tags or keywords for this question. In some embodiments, the tags are generated by: generating a semantic cloud for the question text using the provided inputs; collecting the top X elements with the highest relevance factor, where X is a configurable number determined by user interface requirements.

The question semantic cloud generator 309 receives as input: the text of a question, the person profile for the user that asked the question, and the accompanying user-agnostic semantic databases. The question semantic cloud generator 309 generates a semantic cloud for this question.

The people profiles database 304 may include person's profiles. A person profile may be, for example, a collection of information related to a specific person, which is used as source data for the generation of a semantic cloud for this person.

In some embodiments, the profile may include, for example: user-provided information which categorize (through tags, keywords, selection from flat or hierarchical taxonomies, pointing to external systems in which this information exists, or other means) the user's knowledge; online representations of the user's interest through web sites such as social tagging or bookmarking services, photo sharing services, and others; description of the user's expertise such as the user's resume, online or offline; previously asked questions by this user; previously answered questions by this user, including ranks he received from other users; profiling information collected by the system on the behavioral patterns of this person, such as time of day or week the user is most likely to answer questions, the user's competitiveness, etc; opinions, comments, reviews, chats and other forms of user presence; the type, topic and amount per time period of questions that the user agrees to receive; and/or other data.

The person semantic cloud generator 308 may receive as input a person profile, and may generate a semantic cloud for this person.

The web semantic cloud generator 313 may scan existing web content sources, such as content sites, forums, blogs, etc, to create an overall semantic cloud that describes the relationship between common phrases (tags) based on their real usage. The web semantic cloud generator 313 may operate, for example, by periodically downloading content from the contents sources, performing lexical and/or semantic analysis of the downloaded content, and creating semantic clouds based on the occurrences of certain phrases in the text, while cross-referencing them with existing tag clouds. The web semantic cloud generator 313 stores the generated tag clouds in persistent storage for later reuse.

The system may utilize an object relevancy generator, which may receive as input two objects (such as a person profile and question text), and may generate a semantic cloud based on the person profile, a second semantic cloud based on the question text and the optional tags provided by the user (which serve as second-level roots in the tag cloud), and may perform a calculation to determine the overlap or correlation level between these two tag clouds, using a vector-distance calculation, treating each one of them as a multi-dimensional vector. The result is factored appropriately and returned by the generator as the Relevancy Rank for a specific two objects (e.g., person-question) pair.

The distribution system 316 determines the optimal policy for distributing requests to users, by optimizing the usage of the resources available to the system, in order to fulfill the following goals per each request: minimum time to fulfill a request; and maximum relevancy of each response. Since these goals may at times be conflicting, the system balances them by attempting to reach optimal usage of the system's Request Fulfillment Potential over a period of time.

The system utilizes the learning mechanism 312 to continuously adjust the factors it uses based on the observed behavior of the system, and attempts to re-affirm and discover knowledge on the system and the users on a continuous basis in a methodic manner.

The learning mechanism 312 may suggest personalized adjustments to the person's semantic cloud based on accumulated user profile information, such as asked questions, provided answers, actual ranking of provided answers, rejection or acceptance of questions, and other factual and behavioral information.

The result of the matching algorithm is an input for the distribution system 316 but is not necessarily the only input, as the system may take into account additional multiple parameters such as the user's availability, track record, ranking, usage patterns, behavioral patterns, extrapolation on the system behavior, and others.

Figure 4:
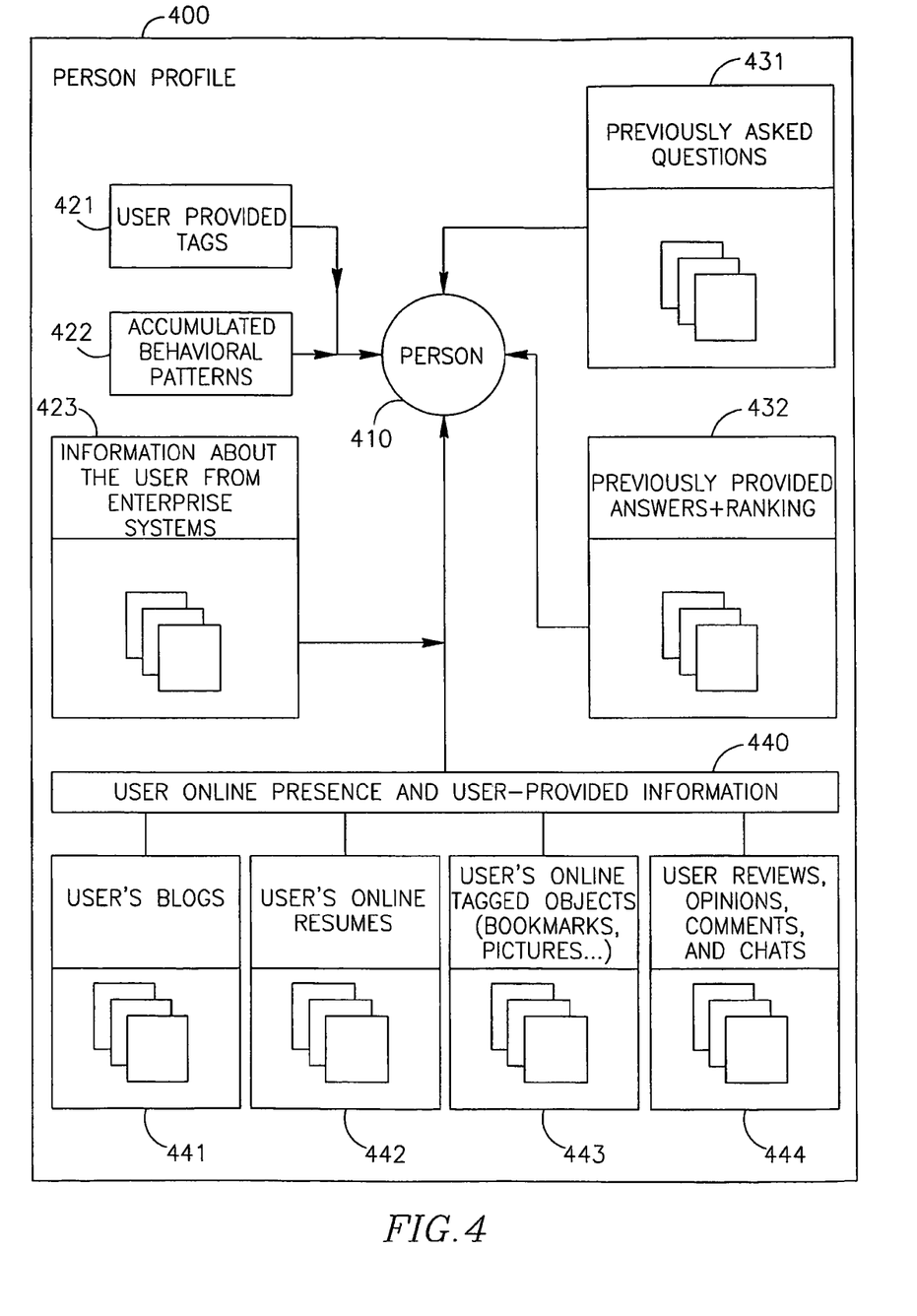
FIG. 4 is a schematic block diagram illustration of a representation of a person profile in accordance with some embodiments of the invention.

FIG. 4 is a schematic block diagram illustration of a representation of a person profile 400 in accordance with some embodiments of the invention. Information about a person 410, or information associated with or related to person 410, may be obtained or determined from or using user-provided tags 421, accumulated behavioral patterns 422, information about the user from enterprise systems 423, previously asked questions 431, previously provided answers and/or ranking 432, and/or user online presence and user-provided information 440, for example, user's blogs 441, user's online resumes 442, user's online tagged objects (e.g., bookmarks, pictures, etc.), user reviews, opinions, comments and chats 444, and/or other suitable information.

Figure 5:
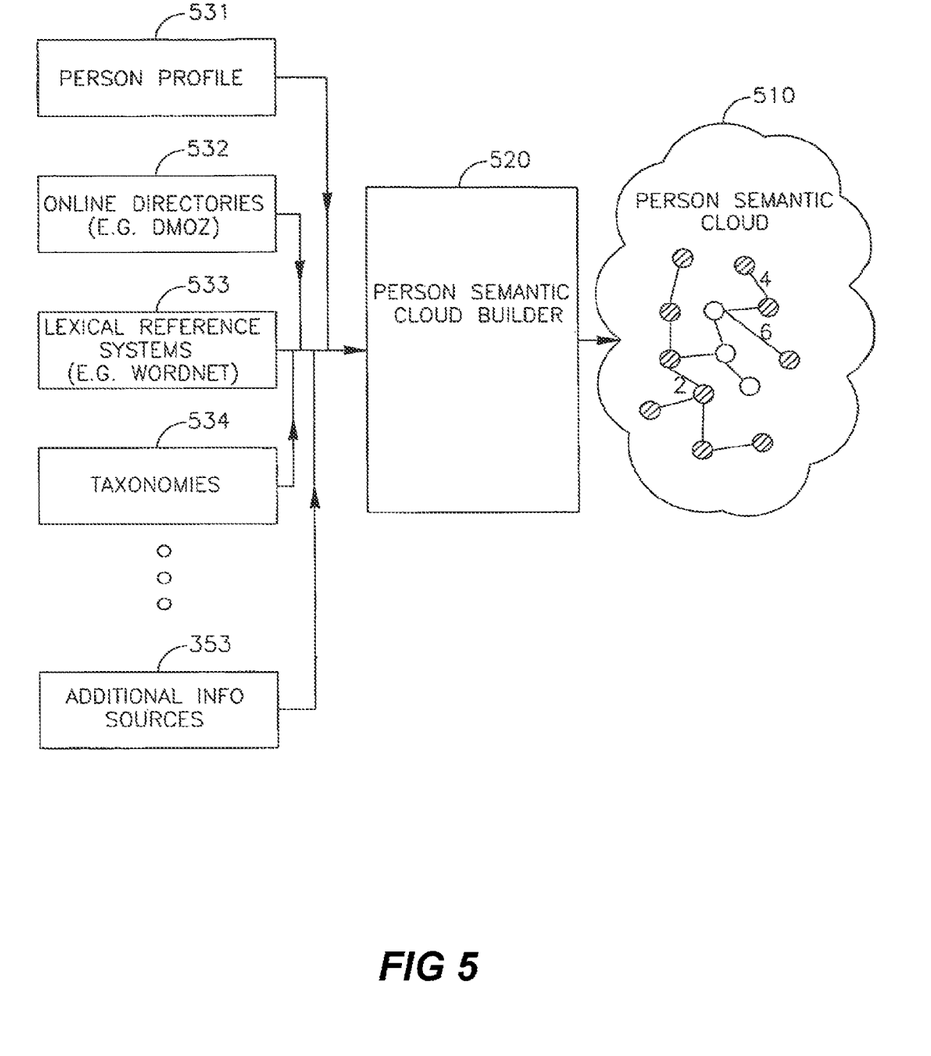
FIG. 5 is a schematic block diagram illustration demonstrating generation of a person's semantic cloud in accordance with some embodiments of the invention.

FIG. 5 is a schematic block diagram illustration demonstrating generation of a person's semantic cloud 510 in accordance with some embodiments of the invention. As shown in FIG. 5, the person's semantic cloud 510 may be generated by a person semantic cloud builder 520 based on one or more inputs, for example, a person profile 531, online directories 532 (e.g., DMOZ directories or open directories), lexical reference systems 533 (e.g., WordNet), taxonomies 534, and/or additional information sources 535.

Figure 6:
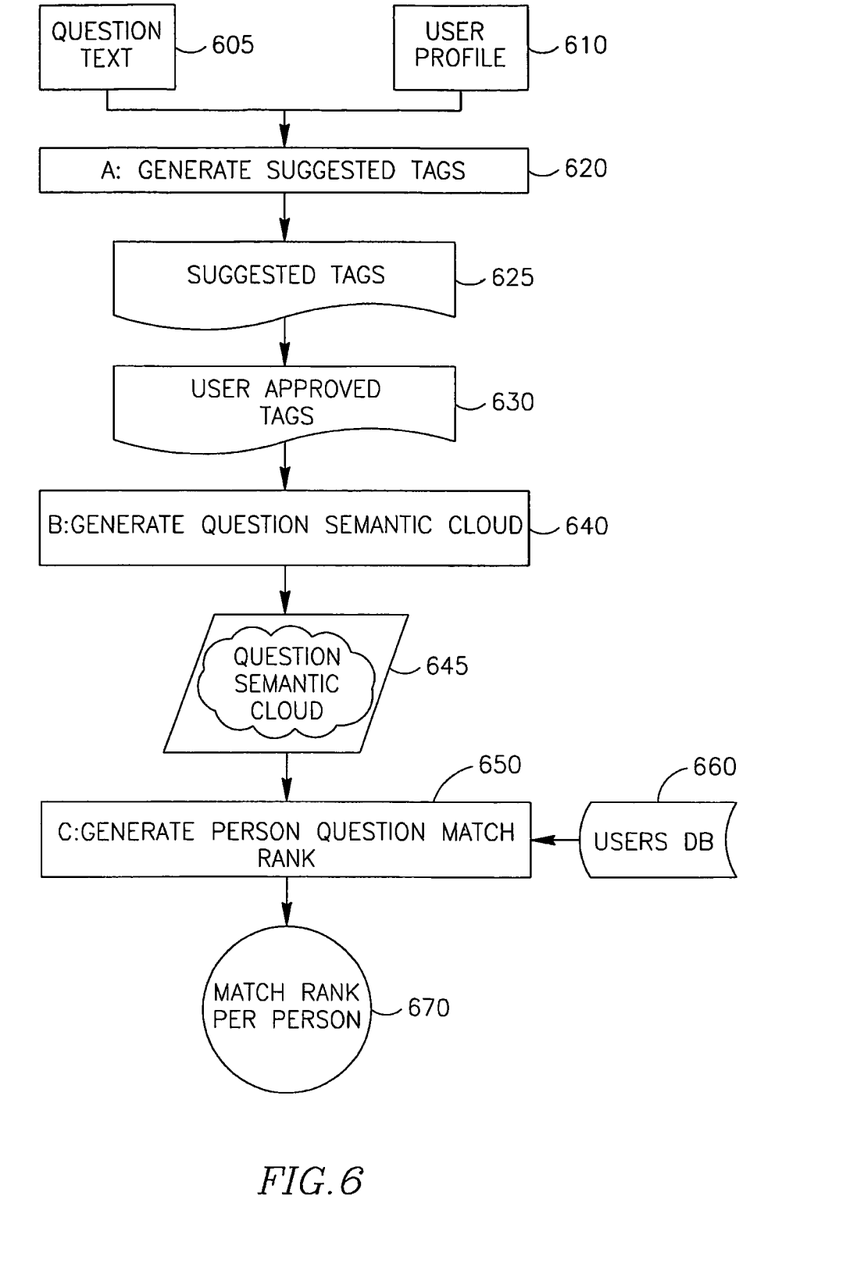
FIG. 6 is a schematic flow-chart of a method of relevancy calculation in accordance with some embodiments of the invention.

FIG. 6 is a schematic flow-chart of a method of relevancy calculation in accordance with some embodiments of the invention. Based on a received question text (block 605) and a received (or generated) user profile (block 610), suggested tags may be generated (block 620). The suggested tags (block 625) may be presented to user's approval, thereby generating user-approved tags (block 630), which may be used to generate question semantic cloud (block 640). The question semantic cloud (block 645) may be used, in conjunction with information from a users database (block 660) to generate a person/question match rank (block 650), thereby producing the match rank per person (block 670).

Example 1

In a first demonstrative example presented herein, some embodiments of the invention may handle a request of a user looking for knowledge.

Kim is an art student. She needs to submit a paper by the end of the week, and to complete it, she needs to find examples of works by contemporary artists dealing with "modern man's bafflement when confronted with a flood of online information".

Kim submits her request for knowledge to the system using a web client (though she may submit it using an instant messenger client, SMS, voice, email, or any of the other forms mentioned earlier).

The system prompts Kim to validate and/or modify the request categories. Then, the system performs a search in its internal database as well as in external data sources, trying to find an existing, relevant response to Kim's request. If such potential responses are found, they are presented to Kim.

The system creates a dynamic blog dedicated to Kim's request and provides Kim with the URL for this blog. The blog contains Kim's request, information about Kim and about the request (such as the request category, status and other metadata), link to more information about Kim, and any response or discussion received so far on this request.

In addition, the system displays in the blog additional information about the request which is retrieved from other internal and external system, as well as potentially information relevant to business partnerships or advertisement.

The actual request is stored in the system database and is queued for later, asynchronous processing.

Asynchronously, the system dequeues the request from the queue, and determines a policy for handling of this request. The system determines that for this specific request category (modern art, contemporary artists) there are 300 registered users who may be able to provide a relevant response.

The system determines that from these users, the user Joe, age 47, from Oregon, receives an average high ranking in these categories, but is able to answer only 1 question a week. The system further determines that the user Jim, age 32, from Japan, usually receives a somewhat lower ranking then Joe, but usually answers about 30 percent of the requests directed to him. The system further determines that the user Ann, age 42, from Chicago, is registered as knowledgeable about these categories, but so far no requests were sent to Ann, even though Ann should be able to answer 2 questions a day.

Joe and Ann allowed the system to send questions through Instant Messaging, while Jim agreed to receive notifications by email.

The system determines that given the fact that the request was submitted a short time ago (shorter than a configurable time period), that Joe is currently unavailable through his instant messaging client, and that the response time Kim experienced in average in the past with the system was well above the average one, it may be determined to distribute this question to Jim instead of Joe, and that this is a good opportunity to check if Ann's knowledge in this area is useful. Jim receives a notification by email, and Ann receives an instant message notifying her of the request. The instant message is sent by a special messenger "bot" or virtual user that was approved by Ann and/or was added to her instant messenger contacts list when she joined the service.

In addition, the system queues the request for later re-inspection of its status and re-calculation of the policy based on its new status.

Ann opens the instant message, quickly scans the request, and finds that she actually knows of several such examples. She types in the messenger window the artists' names and their relevant works. For one of them, she does not recall the work name, so she uses a standard search engine to look it up. In less then a minute she finishes typing the response and hits the Send button.

The system receives Ann's instant message through its integration with the instant messaging network. The system stores Ann's response in the database, updates the request blog, and sends a notification through instant message to Kim, notifying her that a response to her request was received.

Kim receives the link to the blog in the instant message, clicks the URL and opens the blog. As she reads the blog, Jim finds the notification in his email, reads the request, and also provides a response by replying to the email. The blog is dynamically updated with Jim's response.

Next to Jim and Ann's replies there is a tag line, indicating their ranking, certification and custom text and/or graphics that they added, advertising their private blog or company web site, and helping Kim estimate how much she can trust their response.

Unfortunately, while very useful, Jim and Ann responses together provided only 5 examples, and Kim needs 3 more. Therefore, she decides to leave the request open, hoping for more responses.

The system dequeues the request again, and notices that the 3 notifications it sent generated 2 responses, which were useful, but the request is still open.

The system inspects the 300 potentially-relevant registered users again. This time, it decides that the question has been open for a long time, so it is important to try to close it and therefore it does send a notification to Joe, and to 2 additional users with high rankings and high availability. In addition, it sends the request to 3 more users who have declared ability to provide response in this area, but have no history of responses to judge their ranking by.

These notifications generate 3 hours later two additional responses. Kim is now satisfied with the responses she received, and decides to close the request. Kim indicates this intent to the system, and also decides which participants in the blog are awarded incentives (such as points, money, or other incentives) and how much.

In this demonstrative example, Kim's request for knowledge was fulfilled; users who provides useful responses to Kim's request were awarded; the entire discussion is archived for later re-use; and the database is updated with information about Kim's request, her behavioral patterns, the responding users response and their behavioral patterns.

Example 2

In a second demonstrative example presented herein, some embodiments of the invention may handle a request of a user looking for services and/or goods.

Kim graduated from her studies and opened her own small business, a travel agency organizing tours of contemporary artists' hideaways. As her business grows, three employees join her team, and she realizes it is time to provide them all with business cards. Kim goes back to the service and enters her request: "I would like to buy business cards for my small business". This scenario may be a superset of the scenario of Example 1.

Kim submits her request for knowledge to the system using a web client (though she could also have submitted it using an instant messenger client, SMS, voice, email, or any of the other forms mentioned earlier).

The system prompts Kim to validate and/or modify the request categories. Then, the system performs a search in its internal database as well as in external data sources, trying to find an existing, relevant response to Kim's request. If such potential responses are found, they are presented to Kim.

The system creates a dynamic blog dedicated to Kim's request and provides Kim with the URL for this blog. The blog contains Kim's request, information about Kim and about the request (such as the request category, status and other metadata), link to more information about Kim, and any response or discussion received so far on this request.

In addition, the system displays in the blog additional information about the request which is retrieved from other internal and external system, as well as potentially information relevant to business partnerships or advertisement.

In addition, the system searches its list of BizForms, which are a form of light-weight requests-for-proposals (RFPs) designed to handle a community-driven RFP definition system for a dynamic list of topics, for exchange of RFPs between consumers to consumers, businesses to consumers, or businesses to businesses. The system finds 3 BizForms which may be applicable to a request for business cards and presents Kim with the option to choose one of them, fill it with more information about her request for proposal, so that the system can send the RFP to relevant potential providers (merchants or other users), which will in turn potentially provide Kim with proposals for this service.

The actual request is stored in the system database and is queued for later, asynchronous processing.

If a BizForm is selected, the system presents Kim with the BizForm user interface, asking her to provide the details of her RFP, such as one-sided or two-sided business cards, in color or black and white, and other easy-to-fill parameters. If Kim is not sure what would be the best way to define her request, because she does not know if two-sided, bilingual business cards have any importance in her region, she can submit this as a request for knowledge similar to the process described above in Example 1. Her request will be distributed and responses to her request will be added to the blog in the same manner as described earlier.

Once Kim fills and submits the BizForm, the BizForm is saved in the database using an extendable, decentralized XML format. The request and its accompanying XML are then distributed to all relevant users (merchants and others), as determined by the distribution algorithm.

Recipients receive the request either using the notifications mechanism described earlier, or through a dedicated interface designed to handle large quantities of ecommerce-related bizforms and interaction with ecommerce systems.

Recipients provide their proposals to the system using a matching format, whose elements correspond to the elements of the request BizForm. Each such response is posted to the blog, allowing Kim to filter, sort and evaluate these responses, and to solicit request for knowledge on all proposals or on individual proposals.

Each proposal is accompanied by the user's ranking and certification, as well as a tagline advertising the user.

After Kim reviews the proposals she receives and understand them using knowledge requests, Kim may choose one of the proposals, and allow the merchant to contact her directly to finalize the transaction. Potentially they may choose to perform the payment through the system's support of electronic payment mechanisms (such as PayPal, credit cards, or other payment methods).

In this demonstrative example, Kim's request for proposals was fulfilled; users who provides useful responses to Kim's request were awarded; the entire discussion is archived for later re-use; the database is updated with information about Kim's request, her behavioral patterns, the responding users response and their behavioral patterns; the transaction is completed.

Example 3

In a third demonstrative example presented herein, some embodiments of the invention may handle a request of a user looking for information.

Jim is an engineer and a do-it-yourself (DIY) hobbyist. He maintains an active blog describing his experiences with DIY projects, and a separate blog describing his insights related to engineering.

Jim also has an account on del.icio.us, a social tagging and bookmarking web-site, with many bookmarks on DIY-related web pages. Jim maintains his resume (CV) online using the LinkedIn service, and his vacation pictures tagged in the photo-sharing web-site Flickr.

Jim has an account on the system. Jim provided his various online presence to the system—his blogs, social tagging and/or bookmarking, CV, photo sharing, etc. Jim also tagged himself with the following tags: Do-It-Yourself, Mechanical Engineering, Noise Reduction.

Based on the inputs that Jim provided, the system creates a semantic cloud for Jim's profile. This semantic cloud contains all the tags derived from the original tags that Jim specified, combined with tags derived from the online presence points he provided, and expanded to include information from additional semantic databases. The result of this process is a semantic cloud of tags with weights, that describes the topics that Jim had knowledge about and their relevance to him.

Jim would like to build a tree house for his children, but he is not sure which tools he needs for this task. Specifically, he is not sure which saw would be best to cut through plywood.

Jim submits a question to the system with the following text: "I would like to a build a tree house; I am looking for a good, cheap and reliable circular saw able to cut through plywood. Any recommendations or insights?"

The system analyses Jim's question. It performs a lexical analysis on the question text, extracting the first level tags. It then creates a semantic cloud for the question, using Jim's personal semantic cloud as additional input.

Then, the system extracts the five top relevant tags from the semantic clouds and suggests to Jim to tag his question with: Tree House; Circular Saw; Plywood; Do It Yourself; and Need Recommendation.

Jim accepts these tags, and adds: Wood Work; and Home Improvement

The system regenerates a semantic cloud for the question, with the following changes: Jim's personal profile is now not taken into account; and Jim's final list of tags is added as an input for the algorithm.

The system uses the semantic cloud to search through the database, and presents to Jim a list of possible relevant resources, including previously asked similar questions, relevant blogs, relevant users, and relevant content from selected external resources, such as books from online books vendors, articles from online content sites, etc.

Jim browses through these resources, but decides he would like to post the question to the system network.

The system uses the question semantic cloud to find the questions match to users in the database, using the described semantic cloud, and then activates the distribution mechanism to determine the best distribution policy with the calculated match between the questions and users as an input.

The system then contacts the selected users through the appropriate mechanism such as instant messaging, email, RSS or web, and invites them to answer Jim's question. The system continues this distribution process until Jim indicates that he received the answer he needed. The system continuously adjusts the distribution policy based on the patterns it observes, such as users' answers, availability, and other parameters.

Some embodiments of the invention may utilize a computer or a computing device to perform one or more of the described operations. The computer may include, for example, a processor, a memory unit, a storage unit, an input unit (e.g., mouse, keyboard, keypad, microphone, or the like), an output unit (e.g., monitor, screen, speakers, printer, or the like), a communication unit (e.g., wired modem, wireless modem, network card, an antenna, or the like), and/or other suitable components.

The foregoing description and examples of the embodiments of the invention have been presented for the purposes of illustration and description. They are not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A computer-implemented method, comprising:
receiving a request submitted by a submitter;
generating, by at least one processor, a representation of a semantic cloud based on the request, said semantic cloud representation comprising a plurality of tags and weighted links between specific tags representing degrees of association between said specific tags, and comprising numeric data values representing degrees of relevance of said tags to the request;
comparing the semantic cloud representation based on the request to respective representations of semantic clouds related to each of a plurality of users who can potentially respond to the request; and based at least in part on a result of said comparison, selecting, from said plurality of users, at least one user to whom to route the request.

2. The method of claim 1, wherein the request is a question to which the submitter is seeking an answer.

3. The method of claim 1, wherein the semantic cloud representation related to each of the plurality of users comprises a set of tags reflective of topics associated with the respective user, and comprises data values representing degrees of relevance of said tags to the respective user.

4. The method of claim 1, wherein the step of comparing comprises determining a correlation level between the semantic cloud representation based on the request and the respective semantic representation of each based on the plurality of users.

5. The method of claim 1, wherein the step of comparing comprises using a vector-distance calculation in which each of the semantic cloud representations is treated as a multi-dimensional vector.

6. The method of claim 1, further comprising using the semantic cloud representation based on the request to automatically match the request to at least one prior submitted request for which a response is available, and making said response available to the submitter.

7. The method of claim 1, wherein generating the semantic cloud representation based on the request comprises taking profile information of the submitter into consideration in generating the semantic cloud representation based on the request, said profile information being distinct from the request.

8. The method of claim 1, further comprising using a representation of a semantic cloud related to the submitter to generate the semantic cloud representation based on the request, said semantic cloud representation related to the submitter including tags derived from a user profile of the submitter.

9. The method of claim 1, wherein generating the semantic cloud representation based on the request comprises generating a set of suggested tags for the request, and outputting the set of suggested tags to the submitter.

10. The method of claim 9, further comprising providing a user option for the submitter to do at least one of the following: (a) accept the set of suggested tags; (b) submit a modified set of tags for the request.

11. The method of claim 1, wherein selecting at least one user to whom to route the request comprises, for at least a first user of said plurality of users, taking into consideration how many requests have been routed to the first user over a selected period of time.

12. The method of claim 1, wherein selecting at least one user to whom to route the request comprises, for at least a first user of said plurality of user, taking into consideration both (a) an average response time of the first user, and (b) an average response time experienced by the submitter in the past.

13. The method of claim 1, wherein selecting a user to whom to route the request comprises, for at least a first user of said plurality of users, taking into consideration whether the first user is currently online.

14. The method of claim 1, wherein selecting at least one user to whom to route the request comprises, for at least a first user of said plurality of users, taking into consideration whether the first user is currently available to receive the request via an instant messaging client.

15. The method of claim 1, further comprising automatically creating a blog for said question and user responses thereto.

16. A system for matching user-submitted requests to users qualified to respond to such requests, the system comprising:

a generator, including at least one processor, that receives a request submitted by a submitter and generates a representation of a semantic cloud based on the request, the semantic cloud representation comprising a plurality of tags and weighted links between specific tags representing degrees to which the specific tags are related and comprising numeric data values representing degrees of relevance of said tags to the request;

a matching system that compares the semantic cloud representation based on the request to respective representations of semantic clouds related to each of a plurality of users who can potentially respond to the request; and a request distribution system that selects one or more particular users to which to send the request based at least on part on an output of the matching system.

17. The system of claim 16, wherein the semantic cloud representation related to each of the plurality of users comprises a set of tags reflective of topics associated with the respective user, and comprises data values representing degrees of relevance of said tags to the respective user.

18. The system of claim 16, wherein the matching system determines a correlation level between the semantic cloud representation based on the request and the respective semantic cloud representation based on each of the plurality of users.

19. The system of claim 16, wherein the matching system performs a vector-distance calculation in which each of the semantic cloud representations is treated as a multi-dimensional vector.

20. The system of claim 16, further comprising a component that uses the semantic cloud representation based on the request to automatically match the request to at least one prior submitted request for which a response is available.

21. The system of claim 16, wherein the generator takes user profile information of the submitter into consideration in generating the semantic cloud representation based on the request, said profile information being separate from the request.

22. The system of claim 16, wherein the generator takes into consideration a representation of a semantic cloud related to the submitter in generating the semantic cloud representation based on the request, said semantic cloud representation related to the submitter including tags derived from a user profile of the submitter.

23. The system of claim 16, further comprising a tags suggestion generator that generates a set of suggested tags for the request, and outputting the set of suggested tags to the submitter.

24. The system of claim 16, wherein the request distribution system, in selecting one or more particular users to which to send the request, takes into consideration how many requests have been routed to said users over a period of time.

25. The system of claim 16, wherein the request distribution system, in selecting one or more particular users to which to send the request, takes into consideration (a) average response times of the candidate recipients of the requests, and (b) an average response time previously experienced by the submitter.

26. The system of claim 16, wherein the request distribution system, in selecting one or more particular users to which to send the request, takes into consideration whether particular candidate users are currently online.

27. The system of claim 16, wherein the request distribution system, in selecting one or more particular users to which to send the request, takes into consideration whether particular candidate users are currently available to receive the request via an instant messaging client.

* * * * *